United States Patent
van Willigen

(10) Patent No.: US 7,219,557 B2
(45) Date of Patent: May 22, 2007

(54) METHOD AND APPARATUS FOR CALCULATING FLOWING MEDIUM TEMPERATURE IN A MAGNETOINDUCTIVE FLOWMETER

(75) Inventor: Arnould Leendert van Willigen, Capelle aan den Yssel (NL)

(73) Assignee: Krohne, A.G., Basel (CH)

( * ) Notice: Subject to any disclaimer, the term of this patent is extended or adjusted under 35 U.S.C. 154(b) by 84 days.

(21) Appl. No.: 11/105,070

(22) Filed: Apr. 13, 2005

(65) Prior Publication Data
US 2005/0229714 A1 Oct. 20, 2005

(30) Foreign Application Priority Data
Apr. 16, 2004 (DE) .................. 10 2004 019 189

(51) Int. Cl.
*G01F 1/58* (2006.01)
(52) U.S. Cl. .................................. 73/861.12
(58) Field of Classification Search ............ 73/861.12, 73/861.13, 204.22, 204.27
See application file for complete search history.

(56) References Cited
U.S. PATENT DOCUMENTS
4,236,410 A 12/1980 Appel et al.
4,967,603 A 11/1990 Krebs et al.
5,503,026 A 4/1996 Bohm et al.

FOREIGN PATENT DOCUMENTS
DE 10033292 A1 1/2002
DE 10118001 A1 10/2002

*Primary Examiner*—Jewel Thompson
(74) *Attorney, Agent, or Firm*—John F. McKenna; Cesari & McKenna, LLP

(57) ABSTRACT

A method for calculating the temperature of a medium traveling through a measuring tube, while with the aid of at least one field coil a magnetic field is generated which permeates the measuring tube. The electrical resistance of the field coil is measured and the temperature of the field coil, constituting a first temperature, is calculated based on the measured resistance of the field coil. A temperature measurement, constituting the second temperature, is taken at a location other than that of the field coil and the temperature of the flowing medium is calculated on the basis of the first and second temperatures. This provides the user of the flow measuring method an added benefit in that it gives the possibility, in simple fashion, to determine the temperature of the flowing medium. A flowmeter for measuring the medium temperature according to the method is also disclosed.

15 Claims, 2 Drawing Sheets

METHOD AND APPARATUS FOR CALCULATING FLOWING MEDIUM TEMPERATURE IN A MAGNETOINDUCTIVE FLOWMETER

BACKGROUND OF THE INVENTION

1. Field of the Invention

This invention relates to a magnetoinductive flow measuring method for measuring the flow of a medium traveling through a measuring tube, for which, with the aid of at least one field coil, a magnetic field is generated that contains a magnetic field component extending perpendicular to the axis of the measuring tube, the electric resistance of the field coil is measured and, as the first temperature, the temperature of the field coil is calculated on the basis of the measured resistance of the field coil. The invention further relates to a magnetoinductive flowmeter that serves to measure the volume flow of a medium traveling through a measuring tube, incorporating a field coil for generating a magnetic field with a magnetic field component that permeates the measuring tube in a direction perpendicular to the direction of flow, as well as an output device allowing the readout, as the first temperature, of the field-coil temperature calculated on the basis of the measured electrical resistance of the field coil.

2. The Prior Art

A magnetoinductive flow measuring method and a magnetoinductive flowmeter of the type referred to above have been described for instance in JP 08014971 A. According to that publication, the coil temperature in a magnetoinductive flowmeter is determined by measuring the voltage on the field coil. That is to detect changes in the flow rate which are caused by temperature changes of the medium flowing through the measuring tube.

In general, magnetoinductive flow measuring methods and magnetoinductive flowmeters have been well known for some time and have been employed in a variety of different fields of application. The underlying concept of a magnetoinductive flowmeter for measuring the volume flow of a medium traveling through a measuring tube goes all the way back to Faraday who in 1832 proposed applying the principle of electrodynamic induction for measuring flow rates. According to Faraday's Law of Induction, a medium that contains charge carriers and flows through a magnetic field will produce an electric field intensity perpendicular to the direction of flow and perpendicular to the magnetic field. A magnetoinductive flowmeter utilizes Faraday's Law of Induction in that a field coil generates a magnetic field that contains a magnetic field component perpendicular to the direction of flow. Within that magnetic field, each volume element of the medium flowing through the magnetic field and containing a certain number of charge carriers, will contribute the field intensity generated in the volume element concerned to the voltage that can be collected by way of measuring electrodes.

In conventional magnetoinductive flowmeters, the electrodes are designed either for conductive coupling with the flowing medium or for capacitive coupling with the flowing medium. A salient feature of magnetoinductive flowmeters is the proportionality between the measured voltage and the flow rate of the medium averaged across the diameter of the measuring tube, i.e. between the measured voltage and the volume flow.

There are some magnetoinductive flowmeters with a so-called idling detection feature, giving the user information on the fill level of the measuring tube. Then there are magnetoinductive flowmeters that give the user information on the composition of the medium flowing through the measuring tube along the definitions of "liquid" versus "gaseous". This is particularly necessary for correct flow measurements involving strongly foaming substances.

There is also a magnetoinductive flowmeter, described in U.S. Pat. No. 4,651,286, that is equipped with an alarm unit that can emit an alarm signal when the field coil of the magnetoinductive flowmeter is either open or short-circuited. Finally, DE 101 18 001 C2 describes a magnetoinductive flowmeter and a method for operating that flowmeter, in which the temperature of the field coil, hereinafter the first temperature, is determined on the basis of the measured impedance of the field coil, and a shut-off device is provided by means of which the power supply to the field coil is disconnected when the first temperature of the field coil exceeds a predefined temperature level. This is to prevent temperature-induced damage to the magnetoinductive flowmeter, especially to its field coils, without requiring an additional temperature sensor.

SUMMARY OF THE INVENTION

It is the objective of this invention to introduce a magnetoinductive flow measuring method as well as a magnetoinductive flowmeter that can offer the user an added benefit in the form of particularly simple and reliable information on the temperature of the medium flowing through the measuring tube.

In connection with the above-described magnetoinductive flow measuring method, this objective is achieved by determining, as a second temperature, the temperature at a location other than the field coil and by determining the temperature of the flowing medium on the basis of the first temperature and the second temperature.

Thus, a key element of the invention provides for the determination, in addition to the temperature of the field coil based on the electric resistance of the field coil, of a second temperature at a location other than the field coil. That second temperature may be measured in "direct" or "indirect" fashion, meaning that that temperature is measured either directly, or indirectly by way of some other temperature-dependent value, similar to the way in which the first temperature of the field coil is determined on the basis of its electrical resistance. Since the second temperature is measured at a point other than the field coil, the resulting effect will usually be one whereby the second temperature will depend on the temperature of the medium and/or on the ambient temperature in a different way than does the first temperature determined via the electrical resistance of the field coil. Consequently, it is possible by way of the first temperature and the second temperature to arrive at the temperature of the medium, as will be explained hereinafter in further detail.

In a preferred embodiment of the invention, the location for measuring the second temperature is deliberately selected in a way whereby the temperature of the medium and/or the ambient temperature affects the second temperature differently than it does the first temperature.

In a preferred embodiment of the invention, the calculation of the temperature of the flowing medium is made on the basis of a model that reflects the effect of the temperature of the medium and of the ambient temperature on the first temperature and on the second temperature. Since the temperature of the medium and the ambient temperature affect the first temperature and the second temperature differently, i.e. along a different functional factor, a measurement of the first temperature and a measurement of the second temperature will produce a pair of first and second temperature values which the model can accurately correlate with, and which are a function of, a particular value for the temperature of the medium.

The model can be constructed in many different ways. On the other hand, the values for the different temperature levels of the medium that are correlated with a given pair of first-temperature and second-temperature values can also be determined empirically. In a preferred embodiment of the invention, however, the temperature of the flowing medium is calculated using the following formulas:

$$T_1 = aT_M + bT_U + x,$$

$$T_2 = cT_M + dT_U + y,$$

where $T_1$ is the first temperature, $T_2$ is the second temperature, $T_M$ is the temperature of the medium and $T_U$ is the ambient temperature, while a, b, c, d, x and y are constants or functions in at least the first temperature, the second temperature, the temperature of the medium or the ambient temperature. Typically, but not necessarily, the value for x and y can be assumed to be 0. Also, a and c and/or b and d preferably differ from one another.

The second temperature may be measured essentially at any number of locations. However, a magnetoinductive flowmeter used to apply the magnetoinductive flow measuring method according to this invention will typically encompass an electronics enclosure housing the control and evaluation electronics. In a preferred embodiment of the invention, the second temperature is measured in the electronics enclosure.

In the case of a compact instrument in which the electronics enclosure is mounted on the measuring tube and thus directly next to the field coil, the second temperature measured in the electronics enclosure will be affected less by the temperature of the medium, compared to the first temperature determined via the electrical resistance of the field coil, and more strongly by the ambient temperature.

By contrast, in a magnetoinductive flowmeter in which the electronics enclosure is positioned away from the measuring tube and thus from the field coil (i.e. a remote device), the second temperature will remain virtually unaffected by the temperature of the medium. In determining the resistance of the field coil in that type of remote device, a preferred embodiment of the invention also takes into account the resistance, no longer negligible, of the lead cables connecting the field coil to the electronics enclosure.

The method according to this invention, as described to this point, already delivers reliable temperature values for the medium flowing through the measuring tube. However, a preferred embodiment of the invention also provides for the determination of the intrinsic heat of the field coil, applying it in correcting the first temperature and/or the calculated temperature of the flowing medium. This can be accomplished, for instance, by means of a model for the intrinsic heat of the field coil as a function of the coil current or, for specific coil currents, by way of the empirically established intrinsic heat of the field coil.

Where there is an electronics enclosure, a preferred embodiment of the invention provides for the determination of the intrinsic heat of the electronics enclosure, applying it in correcting the second temperature and/or the calculated temperature of the flowing medium. This can be accomplished, for instance, in a way essentially analogous to that described above for determining the intrinsic heat of the field coil.

Finally, in a preferred embodiment of the invention, the first temperature and/or the calculated temperature of the medium is corrected as a function of the measured flow rate of the medium. It has been found that the first temperature, determined via the resistance of the field coil, also depends on the flow rate of the medium, and in this fashion a further improvement can be made in the temperature measurement of the flowing medium.

In terms of the above-described magnetoinductive flowmeter, the aforementioned objective is achieved in that a temperature measuring device is provided for measuring a temperature, constituting the second temperature, at a location other than the field coil, and that a temperature calculating device is provided to which the first temperature and the second temperature values are fed, and that on the basis of the first temperature and the second temperature, the temperature calculating device computes the temperature of the flowing medium.

In a preferred embodiment of the invention, the temperature measuring device is so designed and configured that the second temperature depends on the temperature of the medium and/or the ambient temperature in a manner different from that of the first temperature.

Other preferred embodiments of the magnetoinductive flowmeter according to this invention may be envisioned to carry out the above-described preferred embodiments of the magnetoinductive flow measuring method.

BRIEF DESCRIPTION OF THE DRAWINGS

There are now numerous ways in which the novel magnetoinductive flow measuring method and the magnetoinductive flowmeter according to this invention can be configured and enhanced. In this context, attention is invited to the dependent claims as well as to the following detailed description of a preferred embodiment of the invention with reference to the accompanying drawings in which:

DETAILED DESCRIPTION OF AN ILLUSTRATIVE EMBODIMENT

Figure 1:
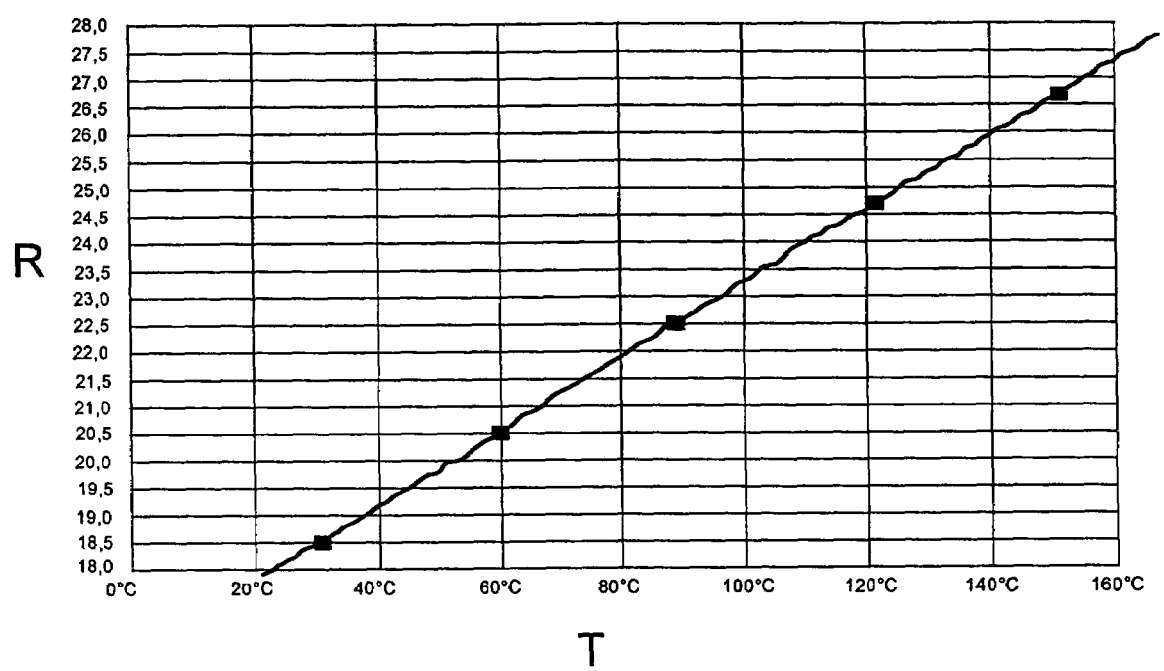
FIG. 1 is a graph showing the temperature dependence of the resistance of a field coil that can be used in the magnetoinductive flowmeter according to the preferred embodiment of the invention.

FIG. 1 shows the relationship between the temperature T of a field coil, employable in a magnetoinductive flowmeter according to a preferred embodiment of the invention, and the electric resistance R of the field coil, expressed in Ohms. It is clearly evident that the measuring points in the form of small black squares are almost ideally positioned along a straight line, indicating a linear relationship between the temperature of the field coil and the electric resistance of the field coil. As will be explained in detail hereinafter, this can be utilized in calculating the temperature of the medium flowing through the measuring tube of the magnetoinductive flowmeter, with the aid of the first temperature determined via the electric resistance of the field coil and of the second temperature, measured at a location other than that of the field coil.

Figure 2:
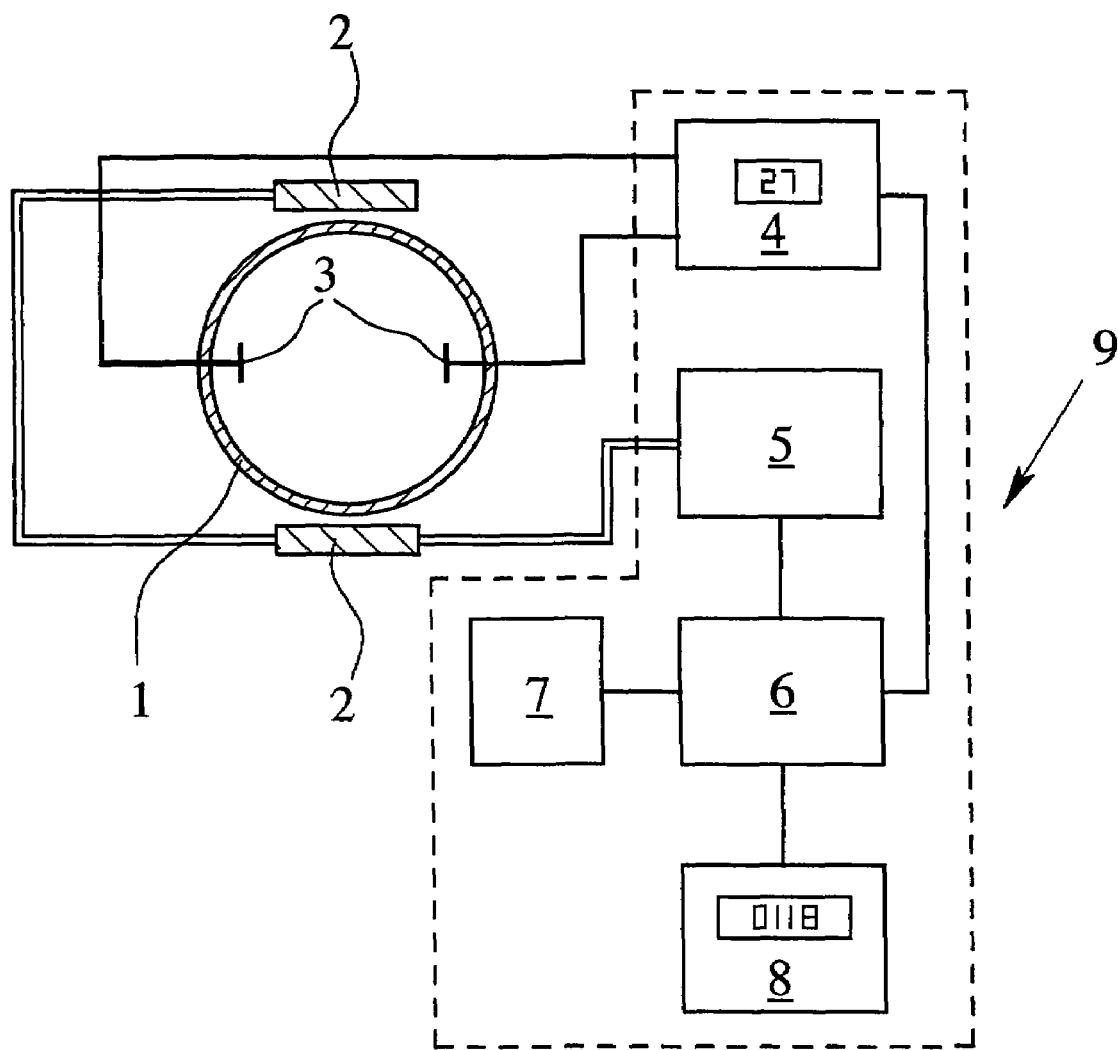
FIG. 2 is a schematic illustration of the magnetoinductive flowmeter according to the preferred embodiment of the invention.

FIG. 2 is a schematic illustration of a magnetoinductive flowmeter according to the preferred embodiment of the invention. It encompasses a measuring tube 1 that is positioned between the field coils 2 of a Helmholtz coil. The field coils 2 generate a periodically alternating magnetic field that extends in a direction perpendicular to the axis of the measuring tube and which induces a voltage in the flowing medium.

Two measuring electrodes 3 collect the induced voltage, and the voltage thus collected by the measuring electrodes 3 is fed to a flow measuring device 4. The flow measuring device 4 indicates the measured flow rate of the medium traveling through the measuring tube 1 on a digital display. Outputting the measured value is also possible via a bus system, not illustrated.

Also provided is an output device 5 for the output of the field-coil temperature calculated on the basis of the measured electrical resistance of the field coils 2. For that, the output device 5 is connected to the two field coils 2. The electrical resistance of the field coils 2 is determined in traditional fashion by simple current and voltage measurements. The output device 5 additionally serves to supply power to the field coils 2.

In accordance with the relationship illustrated in FIG. 1, the electrical-resistance value of the field coils serves as an indicator of the temperature of the field coils 2 which, constituting the first temperature, is fed to a temperature calculating device 6. The temperature calculating device 6 is also connected to a temperature measuring device 7 that serves to determine a temperature, constituting the second temperature, at a location other than that of the field coils 2 and to apply that to the temperature calculating device 6. In the preferred embodiment of the invention described above, the temperature measuring device 7 is a temperature sensor of the direct temperature measuring type.

The temperature of the flowing medium is now calculated on the basis of the first temperature and the second temperature values fed to the temperature calculating device 6, as will now be discussed.

The temperature measuring device 7 is set up in a way whereby the second temperature responds to the temperature of the medium and, respectively, to the ambient temperature differently than does the first temperature. Specifically, the field coils 2 by means of which the first temperature is determined are located much closer to the flowing medium than the temperature measuring device 7, exposing the field coils 2 more strongly to the temperature of the medium. In the case of the above-described preferred embodiment of the invention, it has been established that a good approximation for the first temperature $T_1$ and, respectively, for the second temperature $T_2$ is as follows:

$$T_1 = 0.7 T_M + 0.3 T_U,$$

$$T_2 = 0.2 T_M + 0.8 T_U,$$

where $T_M$ is the temperature of the medium and $T_U$ is the ambient temperature.

Determining the first temperature $T_1$ and the second temperature $T_2$ as described above will result in two equations with two unknowns. Equations of this kind can be solved in traditional fashion, yielding information on the temperature $T_M$ of the flowing medium. The temperature of the flowing medium, thus calculated by the temperature calculating device 6, is then forwarded to a temperature output device 8 which will display the result. There are also other, alternative or additional types of output allowing the calculated temperature of the flowing medium to be displayed.

FIG. 2 indicates that the flow measuring device 4, the output device 5, the temperature calculating device 6, the temperature measuring device 7 and the temperature output device 8 are contained in an electronics enclosure 9. Accommodating these devices in the electronics enclosure 9 causes the electronics enclosure 9 to warm up to a level of intrinsic heat. For a more accurate calculation of the temperature of the flowing medium, a correction can be made for that intrinsic heat of the electronics enclosure 9. To that end, a correcting device, not illustrated, serving to correct the calculated temperature of the flowing medium for the intrinsic heat of the electronics enclosure 9, is integrated into the temperature calculating device 6. This correction is based on the prior empirical determination of the intrinsic heat of the electronics enclosure 9, allowing it to be factored in when the second temperature is determined and, correspondingly, when the temperature of the flowing medium is calculated.

Also integrated into the temperature calculating device 6 is a correction device, not illustrated, that serves to correct the calculated temperature of the flowing medium as a function of the measured flow rate of the medium. To that effect, the flow measuring device 4 transmits the measured flow rate value to the temperature calculating device 6. This makes it possible to compensate for the effect whereby a higher flow rate of the medium traveling through the measuring tube 1 dissipates a larger amount of heat from the field coils 2, the result being a lower first-temperature reading.

Finally, another device integrated into the temperature calculating device 6 is a correction device, not illustrated, that serves to correct the calculated temperature of the flowing medium for the intrinsic heat of the field coils 2 themselves. This correction is a function of the coil current after the prior empirical determination of the relationship between the coil current and the intrinsic heat of the field coils 2.

What is claimed is:

1. A method for calculating the temperature of a medium flowing through the measuring tube of a magnetoinductive flowmeter having at least one field coil, said method comprising the steps of
    measuring the electrical resistance of the field coil;
    as a first temperature, calculating a temperature of the field coil based on a measured electrical resistance thereof;
    as a second temperature, measuring a temperature at a second location other than that of the field coil, and
    calculating the temperature of the flowing medium on the basis of the first and second temperatures.

2. The method as in claim 1, wherein the location for measuring the second temperature is selected in a manner whereby the second temperature is affected by the temperature of the medium and/or an ambient temperature differently than is the first temperature.

3. The method as in claim 2, wherein the calculation of the temperature of the flowing medium is based on a model that reflects the effect of the temperature of the medium and of the ambient temperature on the first temperature and the second temperature.

4. The method as in claim 1 or 2, wherein the calculation of the temperature of the flowing medium is based on the following formulas:

$$T_1 = aT_M + bT_U + x,$$

$$T_2 = cT_M + dT_U + y,$$

where $T_1$ is the first temperature, $T_2$ is the second temperature, $T_M$ is the temperature of the medium and $T_U$ is the ambient temperature, while a, b, c, d, x and y are constants or functions in at least the first temperature, the second temperature, the temperature of the medium or the ambient temperature.

5. The method as in claim 4, wherein, respectively, a and c and/or b and d are different from one another.

6. The method as in claim 1 or 2, wherein an electronics enclosure is provided and the second temperature is measured in the electronics enclosure.

7. The method as in claim 6, wherein an intrinsic heat of the electronics enclosure is determined and is used in correcting the second temperature and/or the calculated temperature of the flowing medium.

8. The method as in claim 1 or 2, wherein an intrinsic heat of the field coil is determined and is used in correcting the first temperature and/or the calculated temperature of the flowing medium.

9. The method as in claim 1 or 2, wherein the first temperature and/or the calculated temperature of the flowing medium is corrected as a function of the measured flow rate of the medium.

10. A magnetoinductive flowmeter comprising
a measuring tube;
a field coil generating a magnetic field which permeates the measuring tube;
an output device for outputting, as a first temperature, a field coil temperature calculated on the basis of a measured electrical resistance thereof;
a temperature measuring device for measuring, as a second temperature, a temperature measured at a location other than that of the field coil, and
a temperature calculating device for receiving the first and second temperature and calculating on the basis thereof, the temperature of the flowing medium.

11. The magnetoinductive flowmeter as in claim 10, wherein the temperature measuring device is so configured and positioned that the second temperature is affected by the temperature of the medium and/or by an ambient temperature differently than is the first temperature.

12. The magnetoinductive flowmeter as in claim 10 or 11, and further including an electronics enclosure and wherein the temperature measuring device measures the temperature in the electronics enclosure.

13. The magnetoinductive flowmeter as in claim 12, and further including a correction device for correcting the second temperature and/or the calculated temperature of the flowing medium as a function of an intrinsic heat of the electronics enclosure.

14. The magnetoinductive flowmeter as in claim 10 or 11 and further including a correction device for correcting the first temperature and/or the calculated temperature of the flowing medium as a function of an intrinsic heat of the field coil.

15. The magnetoinductive flowmeter as in claim 10 or 11, and further including a correction device for correcting the first temperature and/or the calculated temperature of the flowing medium as a function of the measured flow rate of the medium.

* * * * *